United States Patent [19]

Hayward

[11] Patent Number: 5,582,781
[45] Date of Patent: Dec. 10, 1996

[54] METHOD OF MAKING GRAPHITE FOAM MATERIAL

[75] Inventor: Tommie P. Hayward, Saugus, Calif.

[73] Assignee: Polycarbon, Inc., Valencia, Calif.

[21] Appl. No.: 591,363

[22] Filed: Jan. 25, 1996

Related U.S. Application Data

[63] Continuation of Ser. No. 262,743, Jun. 20, 1994, abandoned.

[51] Int. Cl.$^6$ .................................................. C01B 31/04
[52] U.S. Cl. .......................... 264/28; 423/448; 264/29.5
[58] Field of Search .................... 264/28, 29.5; 423/448, 423/460

[56] References Cited

U.S. PATENT DOCUMENTS

| | | | |
|---|---|---|---|
| 3,718,720 | 2/1973 | Lambdin, Jr. | 423/460 |
| 5,130,199 | 7/1992 | Howard | 428/408 |

FOREIGN PATENT DOCUMENTS

| | | |
|---|---|---|
| 2157277 | 10/1985 | United Kingdom . |

OTHER PUBLICATIONS

Database WPI, Section Ch, Week 8545, Derwent Publications Ltd., London, GB; Class A88, AN 85-280492 & JP-A-60 191 058 (Nippon Carbon KK), 28 Sep. 1985–Abstract.

Journal of Materials Science, vol. 22, No. 12, Dec. 1987, London, GB, pp. 4190–4198, D. D. L. Chung, Review–Exfoliation of Graphite.

*Primary Examiner*—Michael Lewis
*Assistant Examiner*—Stuart L. Hendrickson
*Attorney, Agent, or Firm*—Blakely, Sokoloff, Taylor & Zafman

[57] ABSTRACT

The present invention relates to method of making material having superior heat insulation capacity for use in furnaces and other apparatus. The method comprises grinding flexible graphite foil, preferably recycled material, to a small particle size, thermally shocking the particles to expand them, mixing the expanded graphite with a thermoset phenolic resin, heating the mixture under pressure to form a solid sheet and then heat treating the solid sheet.

5 Claims, 3 Drawing Sheets

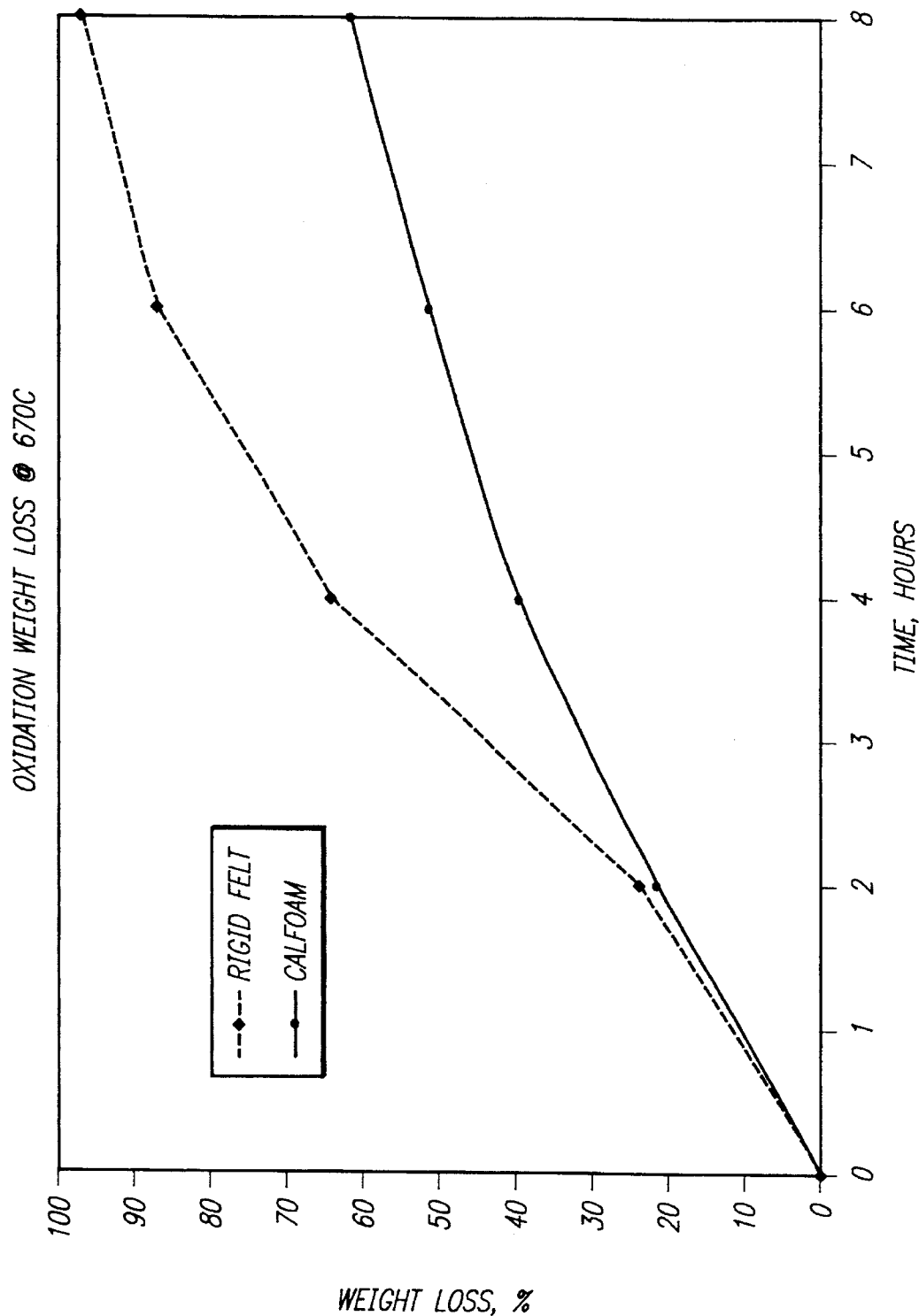

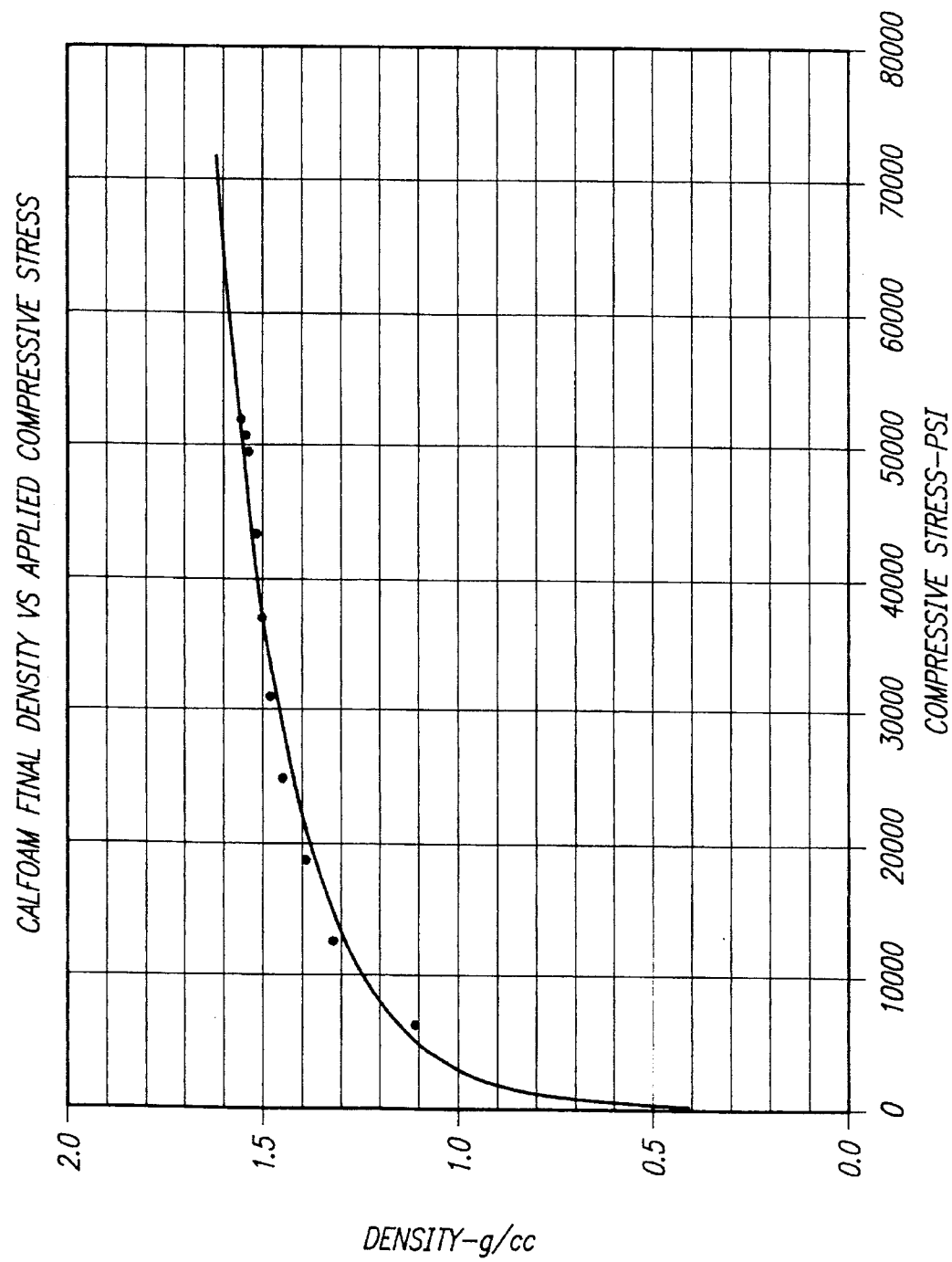

METHOD OF MAKING GRAPHITE FOAM MATERIAL

BACKGROUND OF THE INVENTION

This is a continuation of application Ser. No. 08/262,743 filed Jun. 20, 1994 now abandoned.

1. Field of the Invention

The invention relates to graphite foam material, of the type used for high temperature insulation and the like, and to a method of making the same.

2. Art Background

In the prior art, various forms of graphite material have been used as insulating materials in high temperature applications including industrial ovens and furnaces, vacuum furnaces and controlled atmosphere heating apparatus and the like.

One of the first such graphite insulating materials was powdered carbon black which had an appropriate amount of insulating capacity, but was very difficult to handle, relatively heavy, and extremely time consuming to replace. As a result with the advent of foam and resin chemistry, a number of newer materials were developed which were lighter and easier to handle, but which had the requisite insulating capacity. One such material is a carbon fiber insulating material made of a carbon fiber held in a matrix by a phenolic resin material, and formed into a board or block.

SUMMARY OF THE INVENTION

The present invention is a composition of matter, and specifically, a material comprising cryogenically treated graphite or carbon particles which are then expanded by thermal shock/gas expansion. The expanded particles are then combined with a phenolic resin, or the like, and then thermoset under pressure at an elevated temperature to form a hardened sheet or plate. The carbon or graphite particles can be obtained from previoiusly expanded graphite which has been made into flexible graphite foil, and therefore, the present invention permits the recycling of graphite foil which is not otherwise commercially distributed. The method of making said material is also described and claimed.

The material has generally the same insulating and other physical characteristic as the prior art carbon fiber insulation materials, and it is less expensive than prior art materials.

Another advantage of the present invention is that it can utilize, without any drawbacks, recycled flexible graphite material, as a starting material. Such recycled flexible graphite material is currently typically being landfilled. Thus, the present invention is particularly advantageous as a benefit to the environment. Additionally, the advantageous method of making the material and the quality of the material made in accordance with the present invention provide additional benefits.

Another advantage is the reduced weight loss due to oxidation, resulting in longer furnace life between successive rebuilding of the furnace.

It is an object of this invention to use finished low density blocks, boards, billets, etc. to make higher density parts by cutting (i.e., using, for example, a cork bore or saw) to shape or mold the material into a desired shape and pressing using different pressures to the obtain desired density. For example, die formed rings can be made using the present invention. The compressive strength of the die formed rings was greater than or equal to the strength of some monolithic graphites of the prior art.

These and other objects of the present invention may be understood by reference to the drawings and specification set forth below. It will be understood, however, that the present invention is not limited to the specific embodiments shown in the appended drawings or described in the specification, but to the devices and methods as set forth in the claims, and any equivalents thereto.

BRIEF DESCRIPTION OF THE DRAWINGS

FIG. 3 is a graph showing the oxidation weight loss of prior art rigid felt as compared with the material of the present invention, which is the invented material at 670° C. over time.

FIG. 4 is a graph showing the final density of the invented material as a result of the compressive force applied to it.

DETAILED DESCRIPTION OF THE INVENTION

Figure 1:
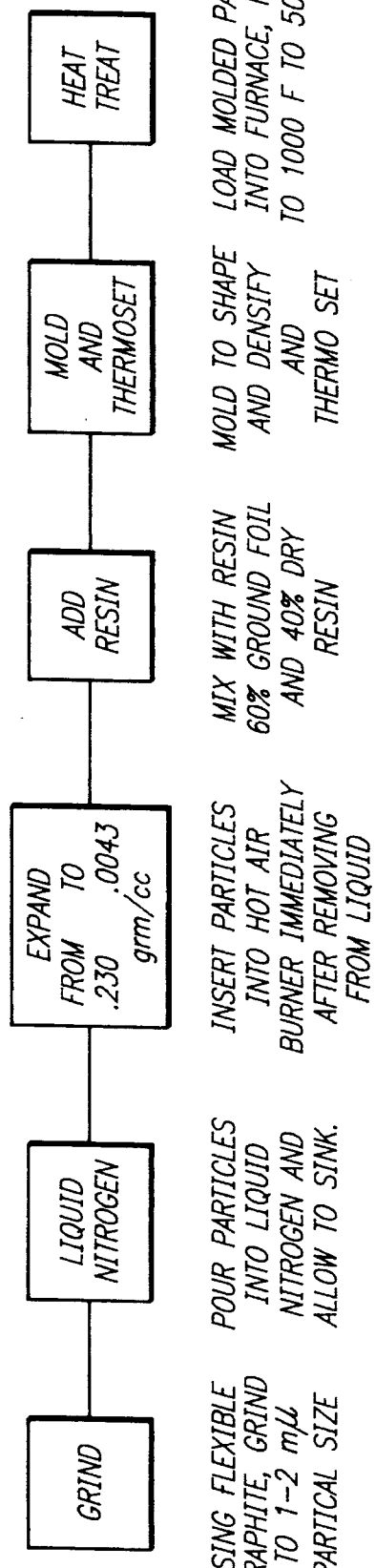
FIG. 1 is a flow chart showing the process of the present invention.

The present invention relates to a material and method of making a material having superior heat insulation capacity for use in furnaces and other apparatus. The method of making the present invention is shown in the flow chart in FIG. 1.

The starting material is preferably recycled flexible graphite, such as the type which may be obtained as a byproduct from the manufacture of flexible graphite rolls.

The flexible graphite material is sometimes referred to as vermiculated graphite. It is a graphite material which has already been subjected to an expansion process, typically an acid treatment of graphite followed by a heat shock treatment. The starting material can be in the form of chunks, bricks, strips, or any other form which may be obtained.

The flexible graphite is first ground to a very fine powder having a particle size in the range of 35 to 80 mesh and a tap density of approximately 0.177–0.230 g/cc. Somewhat smaller or larger mesh can be used as well, but the particle size is preferably within the range of 35 to 80 mesh as specified. The flexible graphite can be ground in a cone mill grinder or hammer mill grinder or other grinder known in the art.

In the next step, the powdered carbon particles are poured into a container of liquid nitrogen, and permitted to absorb sufficient liquid nitrogen so that they sink in the container below the surface of the liquid nitrogen. It is believed that other cryogenic liquids may also work, and are deemed to be within the scope of the present invention. The sinking of the particles, while not deemed critical to the subject process, appears to be an adequate indicator of sufficient absorption of the liquid nitrogen into the particles, which is important in the following expansion step.

Figure 2:
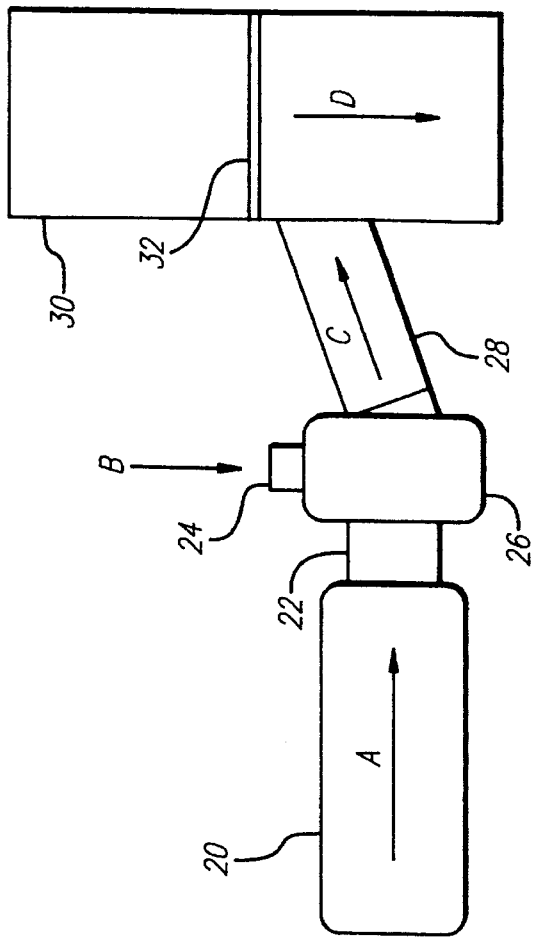
FIG. 2 is a schematic drawing of the heat shock apparatus used in the method of the present invention.

The liquid nitrogen soaked carbon particles are next injected into a hot air burner in an oven with an air stream flowing therethrough, the oven temperature being approximately 650° F. One such acceptable hot air burner is a propane burner such as a Universal® 40,000 BTU per hour propane heater. One possible arrangement is shown in FIG. 2. As shown the heat shock/gas expansion apparatus comprises a propane heater 20, with the heated air flow direction shown by arrow A, coupled through a conduit 22 to a receiving means 24 which receives the liquid nitrogen soaked particles through the top inlet 26 (which are added in the direction shown by arrow B. The receiving means 24 is coupled through conduit 26 to heat treated particles receiving means 28, which has a screen 30 to prevent the particles, which are now very light, from becoming excessively airborne.

If the recycled graphite particles are used, this heat treatment or thermal shock/gas expansion expands the particles to about 4 to 8 times their original size, and the density of the particles is in the range of 0.080 to 0.030 grams per cubic centimeter. The expanded particles may be compressed and molded to the desired size, shape and density without using the next steps.

The expanded, thermally-shocked, carbon material is then mixed with a resin, and preferably a phenolic resin, and most preferably a phenolic resin such as Borden Durite RD-2414 in a preferred ratio of about 60% carbon to 40% resin by weight. Other ratios may be used, and the selection of a ratio is within the skill of persons of ordinary skill in the art.

The mixture is then thermoset at a temperature of 350° F. and a pressure dependent upon the density required for about 1 hour. The shape of the product can be any shape and size as required for the intended purpose.

The thermoset product is then heat treated in a furnace. The temperature of the heat treatment is preferably about 2000° F., but may vary from 1000–5000° F. depending upon final usage.

The density may be in the range from less than 0.1 g/cc to approximately theoretical density.

FIG. 3 shows a comparison of prior art material to the material of the present invention, and particularly shows that there is substantially more weight loss from the prior art material being exposed to elevated temperature over time which is considered disadvantageous to those skilled in the art.

FIG. 4 illustrate the density of the material as a result of the pressure applied to it during its manufacture.

It will be appreciated by persons of ordinary skill in the art that various modifications and changes can be made to the invention as described herein without departing from the spirit and scope of the present invention.

What is claimed is:

1. A method of making a graphite material comprising the steps of:

a) grinding flexible graphite into a powder having a particle size in the range of 25 to 80 mesh, b) soaking the graphite powder in a cryogenic liquid, c) heating the soaked graphite powder to temperature of about 650° F. to cause thermal shock expansion thereof, d) mixing the expanded graphite with thermoset resin in a ratio of about 60% graphite to 40% resin by weight, e) heating the graphite resin mixture under pressure in a mold to form a sheet of graphite material, and f) heat treating the product of step e at a temperature of at least 2000° F.

2. The method of claim 1 wherein said graphite of step a is recycled graphite foil.

3. The method of claim 1 wherein said cryogenic liquid is liquid nitrogen.

4. The method of claim 1 wherein the thermoset resin is a phenolic resin powder.

5. The method of claim 1 wherein the heating in step e occurs at a temperature of about 350° F. for a period of about 1 hour, under pressure.

* * * * *